United States Patent

Grateau et al.

[11] Patent Number: 5,300,465
[45] Date of Patent: Apr. 5, 1994

[54] PHOTOCHROMIC GLASSES WHICH DARKEN TO A PINK HUE

[75] Inventors: Luc Grateau, Paris; Michel Prassas, Vulaines, both of France

[73] Assignee: Corning Incorporated, Corning, N.Y.

[21] Appl. No.: 96,226

[22] Filed: Jul. 26, 1993

[30] Foreign Application Priority Data

Feb. 1, 1993 [FR] France ............................... 93 01034

[51] Int. Cl.⁵ .................. C03C 4/06; C03C 3/076; C03C 3/093; C03C 3/11
[52] U.S. Cl. ........................ 501/13; 501/32; 501/55; 501/56; 501/67; 501/69; 501/70; 501/72; 501/905
[58] Field of Search .................. 501/13, 55, 56, 67, 501/905, 69, 70, 72, 32

[56] References Cited

U.S. PATENT DOCUMENTS

| | | | |
|---|---|---|---|
| 4,374,931 | 2/1983 | Courbin et al. | 501/13 |
| 4,549,894 | 10/1985 | Araujo et al. | 501/13 |
| 4,608,349 | 8/1986 | Kerko et al. | 501/13 |
| 4,757,034 | 7/1988 | Prassas | 501/13 |
| 5,244,845 | 9/1993 | Kerko et al. | 501/67 |

*Primary Examiner*—Mark L. Bell
*Assistant Examiner*—Deborah Jones
*Attorney, Agent, or Firm*—C. S. Janes, Jr.

[57] ABSTRACT

A transparent photochromic glass displaying a pink hue in the darkened state which, in bodies of 2 mm cross section, will exhibit the following optical properties:

(a) a clear (undarkened) luminous transmittance greater than 82%;
(b) a darkened luminous transmittance after 15 minutes' exposure to actinic radiation at 25° C. between about 20-32%;
(c) a darkened luminous transmittance after 15 minutes' exposure to actinic radiation at 40° C. between about 35-55%;
(d) a rate of fading such that the luminous transmittance after 5 minutes' removal from actinic radiation at 25° C. will be at least 30 percentage units higher and will exhibit a luminous transmittance greater than 50%;
(e) a x trichromatic coordinate between 0.3500 and 0.3700; and
(f) a y trichromatic coordinate between 0.3250 and 0.3450;

said glass consisting essentially, expressed in terms of weight percent on the oxide basis, of

| | | | | | |
|---|---|---|---|---|---|
| $SiO_2$ | 52-58 | $ZrO_2$ | 1.5-2.8 | $K_2O$ | 4-8 |
| $B_2O_3$ | 16-21 | $Li_2O$ | 2-3.5 | CaO | 2-3.5 |
| $Al_2O_3$ | 6-9 | $Na_2O$ | 0-2.5 | $TiO_2$ | 1.2-2.5 | with photochromic elements consisting essentially, as analyzed in weight percent, of

| | | | |
|---|---|---|---|
| Ag | 0.15-0.25 | Cl | 0.25-0.40 |
| Br | 0.06-0.13 | CuO | 0.003-0.007 | and containing at least 2 ppm, but less than 10 ppm, Au and up to 0.9% $Er_2O_3$.

3 Claims, No Drawings

PHOTOCHROMIC GLASSES WHICH DARKEN TO A PINK HUE

BACKGROUND OF THE INVENTION

Transparent photochromic glasses or phototropic glasses, as they have been variously termed, have been marketed commercially for about 25 years. Such glasses darken (change color) when exposed to actinic radiation, commonly ultraviolet radiation, and fade back to their original color, i.e., they return to their original optical transmission, when withdrawn from the actinic radiation. The basic disclosure of such glasses is found in U.S. Pat. No. 3,208,860 (Armistead et al.), which patent is directed generally to silicate base glass compositions wherein crystals of silver chloride and/or silver bromide and/or silver iodide confer the photochromic behavior to the glass. The preferred base glasses had compositions within the alkali metal aluminoborosilicate field.

A multitude of patents have been granted subsequently, those patents being drawn to expressly-delineated areas of silicate glass compositions which exhibited exceptional or unusual photochromic properties and/or other remarkable physical and/or chemical behavior. And, in general, the glass compositions encompassed within those patents have also been based in the alkali metal aluminoborosilicate system with silver chloride and/or silver bromide crystals providing the desired photochromism.

The most common application of photochromic glasses has been as ophthalmic lenses and non-prescription sunglasses. The most widely-marketed photochromic glasses for ophthalmic lenses have been produced by Corning Incorporated, Corning, New York, under the trademarks PHOTOGRAY EXTRA and PHOTOBROWN EXTRA. The glass fabricated into ophthalmic lenses marketed under the trademark PHOTOGRAY EXTRA is essentially colorless in the original or fully faded state, and darkens to a gray coloration when subjected to actinic (ultraviolet) radiation. That glass is included within U.S. Pat. No. 4,190,451 (Hares et al.). The glass formed into ophthalmic lenses marketed under the trademark PHOTOBROWN EXTRA is likewise essentially colorless in the original or fully faded state, but darkens to a warm brown coloration when exposed to actinic (ultraviolet) radiation. That glass composition is encompassed within U.S. Pat. No. 4,251,278 (Hares).

The wearer of photochromic eyeglasses not only wishes to have the glass demonstrate good photochromic properties, i.e., the glass quickly darkens to transmissions below about 40% at room temperature, preferably below 30%, and fades quickly, i.e., the glass fades at least 25 percentage points, preferably at least 30 percentage points, after a five minute withdrawal from the actinic radiation at room temperature, but also wishes to have the glass be cosmetically appealing. This concern with cosmetic appearance is especially prevalent in the sunglass market where all colors and shades of colors can be found.

Various means have been proposed for imparting color to photochromic glasses. For example, U.S. Pat. No. 4,240,836 (Borrelli et al.) discloses modifying the surface of silver halide-containing glass articles by heat treating such glass articles under critically-defined conditions. The heat treatment causes the reduction of silver ions to metallic silver in contact with silver halide microcrystals in a region very near the surface of the glass, with the observed color being determined by the geometric form and arrangement of metallic silver on those microcrystals. Such glass articles can exhibit orange, red, purple, or blue surface coloration in the undarkened state.

Various well-recognized glass colorants have been added to the base photochromic glass composition to impart permanent coloration thereto. For example, U.S. Pat. No. 4,018,965 (Kerko et al.) describes the addition of colorants such as the rare earth metal oxides $Er_2O_3$, $Pr_2O_3$, $Ho_2O_3$ and/or the transition metal oxides CoO, NiO, and $Cr_2O_3$ to produce a variety of permanent tints in the glass.

As was noted above, U.S. Pat. No. 4,251,278 discloses the production of photochromic glasses which are essentially colorless in the undarkened state, but which demonstrate a warm brown coloration when exposed to actinic radiation. Those glasses contained crystals of silver chloride and/or silver bromide and/or silver iodide to impart photochromism to the glass. The warm brown color was developed in the glass due to the presence of 1–10 parts per million (ppm) of Pd and/or Au. The patent also describes transparent photochromic glasses exhibiting a brown coloration in the undarkened state and a deeper warm brown coloration in the darkened state. Those glasses also contained crystals of silver chloride and/or silver bromide and/or silver iodide to produce photochromism therein, but included more than 10 ppm Pd and/or Au. Finally, the patent further discloses transparent, silver halide-containing photochromic glasses containing 1–50 ppm Pd plus up to 1% total of 0–0.5% CoO, 0–1% NiO, and 0–1% $Cr_2O_3$ and/or up to 5% total of at least one rare earth metal oxide selected from the group of $Er_2O_3$, $Pr_2O_3$, $Ho_2O_3$, and $Nd_2O_3$, wherein the glass exhibits a particular tint in the undarkened state, that tint being dependent upon the colorant selected, but which tint is complemented with a warm brown hue in the darkened state. As an example, the patent cites the use of $Er_2O_3$, but without specifying the amount included, to impart a permanent pink color to the glass in the undarkened state which, upon the inclusion of Pd and/or Au in amounts greater than 10 ppm, will demonstrate a brown coloration with a warmer tint being complemented with the pink from the $Er_2O_3$.

U.S. Pat. No. 4,746,633 (Mazeau et al.) describes transparent photochromic glasses that in a thickness of 2 mm can darken to a comfort range, i.e., an optical transmission of about 35–60%, when exposed to actinic radiation at room temperature, and which will fade back to a transmission greater than 70% after five minutes' withdrawal from the actinic radiation. The base glasses therefor consisted essentially, expressed in terms of weight percent on the oxide basis, of

| $SiO_2$ | 46–60 | MgO | 0–3.5 |
|---|---|---|---|
| $B_2O_3$ | 16–28 | CaO | 0–6 |
| $Al_2O_3$ | 4–11 | SrO | 0–6 |
| $ZrO_2$ | 2–6 | BaO | 0–6 |
| $Al_2O_3 + ZrO_2$ | 6–13 | MgO + CaO + SrO + BaO | 0–7 |
| $Li_2O$ | 2–5 | $P_2O_5$ | 0–5 |
| $Na_2O$ | 0–4 | $TiO_2$ | 0–3. |
| $K_2O$ | 2.5–9 | | |

The "photochromic elements", i.e., Ag, Br, Cl, and CuO, consisted essentially, as analyzed in weight percent, of

| | | | |
|---|---|---|---|
| Ag | 0.13–0.18 | Cl | 0.16–0.34 |
| Br | 0.08–0.14 | CuO | 0.001–0.004 |

The patent notes that additions of up to about 1% total of classic glass colorants such as CeO, $Er_2O_3$, MnO, and NiO can be incorporated to tint the glass, and up to about 1% SnO or up to 4 ppm Pd can be added to provide a brown coloration in the darkened state.

Surveys and focus group studies have indicated a substantial market for transparent photochromic glasses that, in thicknesses of 2 mm, would darken to a dark range upon exposure to actinic radiation at room temperature, that would fade rapidly when removed from the actinic radiation, and that would exhibit a pink coloration of a definite hue in the darkened state. Thus, those studies showed a consumer desire for glasses which, in the darkened state, would exhibit a color as defined by the trichromatic coordinates determined through the trichromatic colorimetric system of the C.I.E. of 1931 utilizing Illuminant C as the light source between the ranges of $x > 0.3500$ and $< 0.3700$ and
$y > 0.3250$ and $< 3450$.

SUMMARY OF THE INVENTION

I have discovered that photochromic glasses exhibiting such color can be prepared from glasses having base compositions consisting essentially, expressed in terms of weight percent on the oxide basis, of

| | | | |
|---|---|---|---|
| $SiO_2$ | 52–58 | $Na_2O$ | 0–2.5 |
| $B_2O_3$ | 16–21 | $K_2O$ | 4–8 |
| $Al_2O_3$ | 6–9 | CaO | 2–3.6 |
| $ZrO_2$ | 1.5–2.8 | $TiO_2$ | 1.2–2.5 |
| $Li_2O$ | 2–3.5 | | | with the photochromic elements consisting essentially, as analyzed in weight percent, of

| | | | |
|---|---|---|---|
| Ag | 0.15–0.25 | Cl | 0.25–0.40 |
| Br | 0.06–0.13 | CuO | 0.003–0.007, | wherein at least 2 ppm, but less than 10 ppm, Au is incorporated. Where desired, $Er_2O_3$ may be added in amounts up to 0.9% by weight. As will be appreciated, significant additions of $Er_2O_3$ give rise to a permanent pink coloration, i.e., the glass in the undarkened state will display a pink tint. Accordingly, where an essentially colorless glass in the undarkened state is desired, the content of $Er_2O_3$ will not exceed 0.5%. The concentration of the $Er_2O_3$ addition is also governed by the level of Au in the glass. Thus, the content of Au ought not to exceed 9 ppm to insure against a browning of the pink hue. Also, where the Au level is relatively high, the concentration of $Er_2O_3$ must be kept high to maintain the color within the prescribed trichromatic coordinates.

When present in 2 mm thickness, the inventive glasses in the undarkened state exhibit a luminous transmittance higher than 88%. (Where a very slight pinkish tint is desired or can be tolerated, the undarkened luminous transmittance can be as low as 82% and the darkened color will still fall within the prescribed trichromatic coordinates.) Furthermore, when present in 2 mm thickness, the inventive glasses will demonstrate the following photochromic properties:

after an exposure of 15 minutes to actinic radiation at 25° C., the glasses darken to a luminous transmittance between about 20–32%;

after an exposure of 15 minutes to actinic radiation at 40° C., the glasses darken to a luminous transmittance between about 35–55%; and after five minutes' removal from the actinic radiation at 25° C. will fade back at least 30 and preferably at least 35 percentage points of transmittance such that, where the glass is essentially untinted in the undarkened state, the glass will fade back to a luminous transmittance of at least 55% and preferably at least 60%. Even when the glass is given a permanent pink tint in the undarkened state, the depth thereof will not be so great that the glass will not fade back to a luminous transmittance greater than 50%.

As can be recognized from the above description, the basic goal of the present invention was to produce transparent photochromic glasses demonstrating photochromic properties similar to those displayed by the glasses of U.S. Pat. No. 4,746,633, supra, properties within the dark range, but which would exhibit a precisely-defined pink hue in the darkened state, and, if desired, may exhibit a slight pink tint in the undarkened state. I found that glasses demonstrating those properties, coupled with the desired pink tint, could be prepared by carefully controlling the concentrations of the base glass components, including the ranges of the photochromic elements, and then incorporating Au and optionally $Er_2O_3$ in strictly restricted amounts. Whereas U.S. Pat. No. 4,251,278 supra, discloses the use of Au in amounts of less than 10 ppm, the coloration produced thereby is stated to be a warm brown. Likewise, that patent refers to the use of $Er_2O_3$ to impart a permanent pink to the undarkened glass. But, again, a brown coloration is produced in the darkened state. The compositions of the present inventive glasses are outside of those described in that patent. Au is nowhere mentioned in U.S. Pat. No. 4,746,633; up to 4 ppm Pd is noted as being useful in providing a brown coloration in the darkened state. Thus, the color demonstrated by the glasses of this subject invention has not been disclosed elsewhere and results from a combination of components not disclosed or suggested in the prior art.

DESCRIPTION OF THE EMBODIMENT

Reported below in terms of weight percent on the oxide basis as calculated from the batch is the most preferred base glass composition. Inasmuch as volatilization of those ingredients during melting of the batch is very slight, for all practical purposes the values recorded may be deemed to represent weight percent in the finished glass. The actual batch materials employed can comprise any materials, either oxides or other compounds, which, when melted together, are converted into the desired oxide in the proper proportions. For example, $Li_2CO_3$ and $CaCO_3$ may comprise the sources of $Li_2O$ and CaO, respectively.

The ingredients of the batch were compounded, thoroughly mixed together to assist in obtaining a homogeneous melt, and then progressively transferred into a platinum crucible to be heated through the Joule effect. The batch was melted for 3 hours at about 1400° C. After forming into desired shapes, those shapes were annealed at about 450° C.

| SiO₂ | 54.5 | ZrO₂ | 2.6 | K₂O | 4.9 |
|---|---|---|---|---|---|
| B₂O₃ | 20.2 | Li₂O | 2.8 | CaO | 2.9 |
| Al₂O₃ | 8.6 | Na₂O | 1.5 | TiO₂ | 2.0 |

Table I recites a number of glass compositions illustrating the strict control over composition that must be exercised in order to attain the desired photochromic properties along with a pink coloration is defined by the selected trichromatic coordinates. Thus, the table recites the photochromic elements, as analyzed in weight percent in the finished glass, and the additions of Au, Pd, and Er₂O₃ in weight percent. Analyses of the photochromic elements have indicated losses during melting of about 30–40% for Cl, 40–50% for Br, 5–15% for Ag, and 0–5% for CuO.

TABLE I

| | 1 | 2 | 3 | 4 | 5 | 6 |
|---|---|---|---|---|---|---|
| Ag | 0.229 | 0.216 | 0.216 | 0.216 | 0.221 | 0.241 |
| Cl | 0.375 | 0.380 | 0.380 | 0.380 | 0.358 | 0.382 |
| Br | 0.087 | 0.083 | 0.083 | 0.083 | 0.080 | 0.088 |
| CuO | 0.004 | 0.004 | 0.004 | 0.004 | 0.004 | 0.004 |
| Au | 0.0004 | 0.0003 | 0.0003 | 0.0003 | 0.0005 | 0.0005 |
| Er₂O₃ | — | 0.3 | 0.5 | 0.8 | 0.3 | 0.8 |

| | 7 | 8 | 9 | 10 | 11 | 12 |
|---|---|---|---|---|---|---|
| Ag | 0.189 | 0.216 | 0.233 | 0.218 | 0.216 | 0.218 |
| Cl | 0.363 | 0.380 | 0.369 | 0.356 | 0.380 | 0.369 |
| Br | 0.079 | 0.083 | 0.080 | 0.078 | 0.083 | 0.080 |
| CuO | 0.004 | 0.004 | 0.004 | 0.0035 | 0.004 | 0.005 |
| Au | 0.0003 | 0.0003 | 0.0003 | 0.0003 | 0.0003 | 0.0003 |
| Er₂O₃ | 0.3 | 0.3 | 0.3 | 0.3 | 0.3 | 0.3 |

| | 13 | 14 | 15 | 16 | 17 | 18 |
|---|---|---|---|---|---|---|
| Ag | 0.218 | 0.216 | 0.220 | 0.216 | 0.213 | 0.226 |
| Cl | 0.338 | 0.380 | 0.353 | 0.380 | 0.364 | 0.374 |
| Br | 0.080 | 0.083 | 0.077 | 0.083 | 0.115 | 0.090 |
| CuO | 0.004 | 0.004 | 0.004 | 0.004 | 0.004 | 0.0065 |
| Au | 0.0003 | 0.0003 | 0.0003 | 0.0003 | 0.0003 | — |
| Er₂O₃ | 0.3 | 0.3 | 0.3 | 0.3 | 0.3 | — |

| | 19 | 20 | 21 | 22 | 23 | 24 |
|---|---|---|---|---|---|---|
| Ag | 0.227 | 0.227 | 0.211 | 0.238 | 0.192 | 0.227 |
| Cl | 0.376 | 0.366 | 0.357 | 0.354 | 0.353 | 0.379 |
| Br | 0.088 | 0.083 | 0.071 | 0.071 | 0.070 | 0.087 |
| CuO | 0.0065 | 0.0065 | 0.004 | 0.004 | 0.004 | 0.004 |
| Au | — | — | — | — | — | — |
| Er₂O₃ | — | — | 1.4 | 1.4 | 1.4 | — |
| Pd | 0.00015 | 0.0003 | 0.00015 | 0.00015 | 0.00015 | — |

| | 25 |
|---|---|
| Ag | 0.227 |
| Cl | 0.371 |
| Br | 0.085 |
| CuO | 0.004 |
| Au | — |
| Er₂O₃ | — |
| Pd | 0.0001 |

Samples of each of the above glasses were moved into an electrically-heated furnace and exposed at a temperature of about 650° C. for a period of about 15 minutes to develop photochromism therein. In general, temperatures between about 600°–675° C. for various lengths of exposure periods have been found to be operable in generating photochromism therein. Subsequently, the samples were withdrawn from the furnace and thereafter ground and polished to a thickness of 2 mm.

Table II lists measurements of the photochromic behavior exhibited by the polished samples utilizing the solar simulator apparatus whose principle is discussed in U.S. Pat. No. 4,190,451 (Hares et al.). The color of the glasses in the darkened state is defined by the trichromatic coordinates (x, y) determined through the trichromatic colorimetric system of the C.I.E. of 1931 employing Illuminant C as the light source. This colorimetric system and light source are explained by A. C. Hardy in the Handbook of Colorimetry, Technology Press M.I.T., Cambridge, Mass. (1936). The color in the darkened glass was determined after an exposure of 20 minutes at 25° C. under a source of ultraviolet light ("Black light-blue lamp"). In Table II $T_O$ designates the luminous transmittance of a glass in the clear (undarkened) state;

$T_{D15}(25)$ designates the luminous transmittance of a glass in the darkened state after 15 minutes, exposure to the solar simulator source of actinic radiation at 25° C.;

$T_{D15}(40)$ designates the luminous transmittance of a glass in the darkened state after 15 minutes, exposure to the solar simulator source of actinic radiation at 40° C.; and $F5(25)$ designates the percentage points of luminous transmittance which a glass faded after five minutes, removal from the solar simulator source of actinic radiation at 25° C.

TABLE II

| | 1 | 2 | 3 | 4 | 5 | 6 |
|---|---|---|---|---|---|---|
| $T_o$ | 89.8 | 89.3 | 87.7 | 87.3 | 83.8 | 82.8 |
| $T_{D15}(25)$ | 26.3 | 26.2 | 27.2 | 27.9 | 24.7 | 22.7 |
| $T_{D15}(40)$ | 42.4 | 44.5 | 45.9 | 46.9 | 38.9 | — |
| $F5(25)$ | 34.0 | 38.9 | 41.4 | 40.2 | 37.7 | 35.7 |
| x | 0.3612 | 0.3612 | 0.3581 | 0.3588 | 0.3612 | 0.3585 |
| y | 0.3401 | 0.3391 | 0.3339 | 0.3326 | 0.3329 | 0.3266 |

| | 7 | 8 | 9 | 10 | 11 | 12 |
|---|---|---|---|---|---|---|
| $T_o$ | 87.3 | 89.3 | 87.1 | 88.0 | 89.3 | 88.2 |
| $T_{D15}(25)$ | 28.9 | 26.2 | 26.5 | 28.8 | 26.2 | 30.3 |
| $T_{D15}(40)$ | 48.7 | 44.5 | 45.2 | 40.9 | 44.5 | 52.2 |
| $F5(25)$ | 41.3 | 38.9 | 37.5 | 32.5 | 38.9 | 42.1 |
| x | 0.3576 | 0.3613 | 0.3630 | 0.3603 | 0.3618 | 0.3543 |
| y | 0.3367 | 0.3391 | 0.3364 | 0.3339 | 0.3391 | 0.3342 |

| | 13 | 14 | 15 | 16 | 17 | 18 |
|---|---|---|---|---|---|---|
| $T_o$ | 88.7 | 89.3 | 87.0 | 89.3 | 86.9 | 90.7 |
| $T_{D15}(25)$ | 27.8 | 26.2 | 26.6 | 26.2 | 24.8 | 23.7 |
| $T_{D15}(40)$ | 45.8 | 44.5 | 45.3 | 44.5 | 42.4 | 42.6 |
| $F5(25)$ | 40.8 | 38.9 | 38.8 | 38.9 | 41.4 | 43.2 |
| x | 0.3613 | 0.3618 | 0.3614 | 0.3618 | 0.3575 | 0.3145 |
| y | 0.3371 | 0.3391 | 0.3368 | 0.3391 | 0.3394 | 0.3156 |

| | 19 | 20 | 21 | 22 | 23 | 24 |
|---|---|---|---|---|---|---|
| $T_o$ | — | — | — | — | 87.4 | 90.0 |
| $T_{D15}(25)$ | — | — | — | — | 27.2 | 22.5 |
| $T_{D15}(40)$ | — | — | — | — | 43.1 | 33.9 |
| $F5(25)$ | — | — | — | — | 34.5 | 30.2 |
| x | 0.3364 | 0.3292 | 0.3475 | 0.3431 | 0.3441 | 0.3215 |
| y | 0.3322 | 0.3233 | 0.3283 | 0.3236 | 0.3279 | 0.3206 |

| | 25 |
|---|---|
| $T_o$ | 89.4 |
| $T_{D15}(25)$ | 25.7 |
| $T_{D15}(40)$ | 41.4 |
| $F5(25)$ | 34.3 |
| x | 0.3485 |
| y | 0.3345 |

Examples 18–25 comprise comparative examples illustrating the careful control that must be exercised over composition in order to achieve the required pink tint. Thus, even apparent very slight changes outside of the designated compositional intervals can place the color outside of the demand trichromatic coordinates and/or leads to a permanent coloration which is too dark.

Example 5 is our most preferred composition.

Whereas the photochromic properties of Examples 19–22 were not measured, because the base compositions of the glasses are quite similar to those of Examples 23-25, it is believed that the photochromic properties of the former glasses would closely track those of Examples 23-25.

What is claimed is:

1. A transparent photochromic glass displaying a pink hue in the darkened state which, in bodies of 2 mm cross section, will exhibit the following optical properties:
   (a) a clear (undarkened) luminous transmittance greater than 82%;
   (b) a darkened luminous transmittance after 15 minutes' exposure to actinic radiation at 25° C. between about 20-32%;
   (c) a darkened luminous transmittance after 15 minutes, exposure to actinic radiation at 40° C between about 35-55%;
   (d) a rate of fading such that the luminous transmittance after 5 minutes' removal from actinic radiation at 25° C. will be at least 30 percentage units higher and will exhibit a luminous transmittance greater than 50%;
   (e) a x trichromatic coordinate between 0.3500 and 0.3700; and
   (f) a y trichromatic coordinate between 0.3250 and 0.3450;

said glass consisting essentially, expressed in terms of weight percent on the oxide basis, of

| $SiO_2$ | 52-58 | $ZrO_2$ | 1.5-2.8 | $K_2O$ | 4-8 |
|---|---|---|---|---|---|
| $B_2O_3$ | 16-21 | $Li_2O$ | 2-3.5 | CaO | 2-3.5 |
| $Al_2O_3$ | 6-9 | $Na_2O$ | 0-2.5 | $TiO_2$ | 1.2-2.5 | with photochromic elements consisting essentially, as analyzed in weight percent, of

| Ag | 0.15-0.25 | Cl | 0.25-0.40 |
|---|---|---|---|
| Br | 0.06-0.13 | CuO | 0.003-0.007 | and containing at least 2 ppm, but less than 10 ppm, Au and up to 0.9% $Er_2O_3$.

2. A transparent photochromic glass according to claim 1 exhibiting a clear luminous transmittance of at least 88% and a rate of fading such that after 5 minutes' removal from actinic radiation the glass will exhibit a luminous transmittance of at least 60%.

3. A transparent photochromic glass according to claim 2 wherein the content of $Er_2O_3$ will not exceed 0.5%.

* * * * *